Aug. 15, 1939.　　　J. SANCHEZ　　　2,169,375

CHERRY PITTER HEAD

Filed June 1, 1938

INVENTOR.
JOHN SANCHEZ.
BY Lippincott & Metcalf
ATTORNEYS.

Patented Aug. 15, 1939

2,169,375

UNITED STATES PATENT OFFICE 2,169,375

CHERRY PITTER HEAD

John Sanchez, San Francisco, Calif., assignor to S & W Fine Foods, Inc., San Francisco, Calif., a corporation of California Application June 1, 1938, Serial No. 211,153

3 Claims. (Cl. 146—19)

My invention relates to fruit pitting machinery, and particularly to an improved form of fruit pitting mechanism.

Among the objects of my invention are:

To provide an improved form for knives operable to remove pits from fruit; to provide a pitting head adapted to eject fruit stones with a minimum amount of tearing the fruit; to provide pitting knives in a form acting to center the fruit pit against a supporting background; to provide knives in a form operable to accurately position the pit to be ejected in registry with an aperture formed in the fruit supporting means; to provide means for accurately alining the ejecting mechanism with fruit supporting means; to provide ejecting means wherein the knife elements do not cut through the side of the fruit opposite the point of entrance; to provide pitting elements operable with less mutilation of the fruit by virtue of requiring only a partial passage through the fruit of the cutting means, and completing expulsion of the pit without additional cutting of the fruit.

Other objects of my invention will be apparent or will be specifically pointed out in the description forming a part of this specification, but I do not limit myself to the embodiment of the invention herein described, as various forms may be adopted within the scope of the claims.

My pitting head is designed particularly to operate in conjunction with pitting machinery of the type disclosed in the patent application of Paul Wormser entitled "Fruit pitting method", filed June 15, 1936, with Serial No. 85,185, and the joint application filed May 6, 1936, by Herschel M. Connor and Ellsworth W. Carroll, Serial No. 78,192, entitled "Fruit pitter".

These and other applications filed by my associate disclose apparatus for distributing fruit to be pitted onto conveyor chains formed of a plurality of individual conveyor cups linked together in an endless belt. The cups are of a particular design, being formed of rubber, with an aperture through which the cherry pits may be expelled, and the resilient backing thus afforded supports the fruit against the pressure of the pitting mechanism without bruising or other injury.

Various types of pit-ejecting means have been developed, and while successful in operation, have not been completely satisfactory in certain respects. One difficulty which has been found is that of accurately alining the pit with the ejecting means. Another difficulty has been that the ejecting means, of necessity sharp in order to penetrate, were inclined to cut too much of the fruit, so that the pitted product did not keep the shape of the whole fruit. While this is not objectionable from the standpoint of flavor or edible characteristics, the appearance is less likely to attract the potential customer.

To meet these needs, I have, in the present case, developed a form of pitter which centers the pit with respect to an ejecting punch automatically, and in which the fruit is less cut than in previous developments.

The operations may be better understood by reference to the drawing, wherein, to a scale of approximately 1½ to 1:

Figure 1:
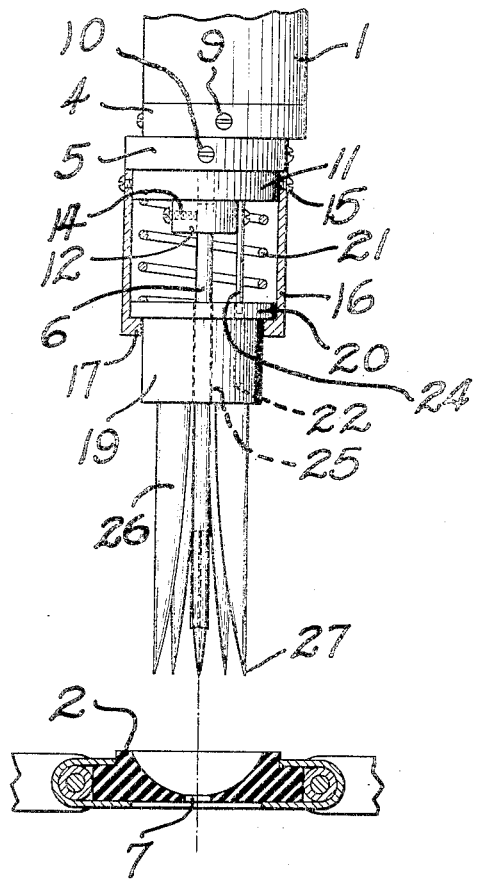
Fig. 1 is a view, partially in section, of my device with the pit-positioning elements extended, shown in relation to a section of conveyor chain.
Figure 2:
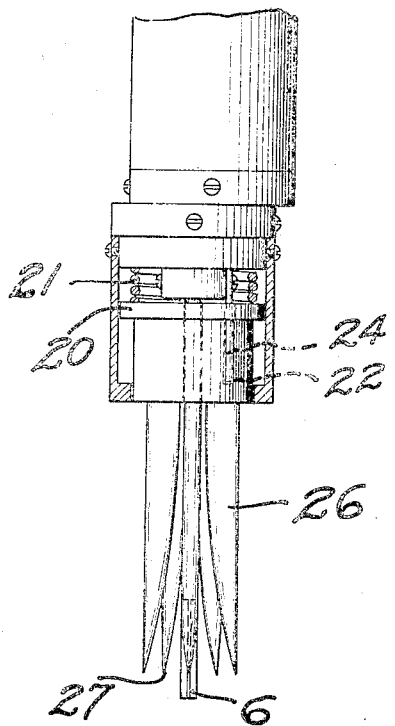
Fig. 2 is a similar view of my device with the positioning elements retracted.
Figure 3:
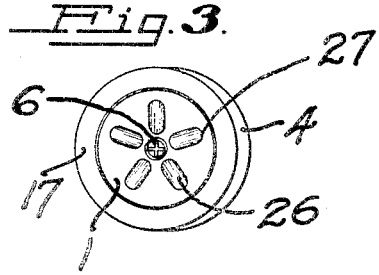
Fig. 3 is a bottom view of the mechanism.

The pitting device is supported on a shank 1 attached to a head mechanism, not shown, and the details of which form no part of the present mechanism. The head mechanism operates to reciprocate the shank 1 up and down, the down movement occurring in proper synchronism with the arrival under the shank of the conveyor cup 2, a number of which are linked together in an endless chain.

Two discs 4 and 5 connected by an eccentrically located pin, not shown, are provided to accurately center the ejecting punch 6 over the cup aperture 7 through which the cherry pit will be driven. By means of set screws 9 and 10 in discs 4 and 5, the relation between the separate discs and the pin may be varied, and a two-dimensional adjustment of the punch 6 made. Such devices are well known in the art, and any equivalent centering means are deemed fully equivalent to the embodiment shown. The lower disc 5 carries an extended cylindrical portion 11 of lesser diameter, beneath which in turn is a further extended cylindrical portion 12.

Elements 5, 11, and 12 are centrally drilled to receive punch 6, and a set screw 14 operates in element 12 to fixedly maintain the punch in position.

Surrounding element 11 and fixed removably thereto by set screws 15 is a cylindrical housing 16, at the bottom edge of which is formed an inwardly extending flange 17 defining a guide aperture through which a needle head 19 may slide.

Head 19 carries around its upper end a flange 20 of diameter such as to form a sliding fit with the interior of housing 16, and is thus formed to move upward to contact element 12 and downward until flanges 17 and 20 engage. A coil spring 21 bearing against flange 20 and cylindrical element 11 maintains the head 19 normally extended.

Head 19 is drilled at 22 to receive a pin 24 fixed in element 11 parallel to punch 6. This pin prevents rotation of the head during its reciprocation. A hole 25 is drilled centrally through the head 19, of such diameter that a loosely sliding fit is formed around punch 6.

A number of needles 26 are set into the bottom of needle head 19, spaced uniformly about punch 6. The outer sides of needles 26 define a cylinder concentric about the punch, while the inner sides taper gradually from the needle points 27 to thicker stems, the stems being of roughly oval cross-section at the point of attachment to the needle head, and the longer dimension of the cross-section being radially disposed about the punch.

The operation of my device is as follows:

At the instant that the cherry arrives beneath the pitter, the shank 1 drops down, driving the needles into the fruit. Needle points 27 contact the stone, and by virtue of their shape may surround it partially, at the same time centering it relative to the punch 6.

The tension of spring 21 is so predetermined that when the resistance encountered by the needles exceeds a certain value, they will stop, while the punch 6 continues to move downward and expel the centered pit. By this method of operation, I reduce the liklihood of the penetration by the needle points 27 of the rubber cups 2, and the tendency to too completely cut the fruit apart. I find that by proper adjustment of the spring 21, obtained by preforming it to have a desired tension, the stone may be ejected without the penetration of the fruit skin in that part thereof contacting the cup.

I find also that by reason of the needle shape illustrated, the fruit exhibits less tendency to stick to the ejecting means, and there is less destruction of the fruit structure.

It will thus be seen that I have provided a pitting device which will be self-centering as to the pit-ejecting element, and which will operate with a minimum of tearing and cutting of the fruit, so that its commercial value is enhanced by the stone extraction without loss of visual appeal to the consumer. At the same time, I have reduced the wear on conveyor cups, and made for more economical operation by removing the tendency of the fruit to stick to the ejector and leave the conveyor cups. While the device has been explained with reference primarily to cherries, it is to be understood that it is equally applicable to olives or any other fruit of similar size.

I claim:

1. In combination with a reciprocating head arranged to move downward in synchronism with the movement into registry therebeneath of centrally apertured conveyor cups, means for pitting cherries and similar fruit comprising a shank fixed to said reciprocating head, a punch fixed to and axially alined with said shank, a centrally apertured needle head slidably disposed about said punch, resilient means for maintaining normally a desired separation between said needle head and said shank, a cylindrical element fixed to said shank arranged to act as an external guide for said needle head, an inwardly directed flange formed on said cylindrical element positioned to prevent movement of said head by said resilient means thereby, means for preventing rotation of said head within said cylindrical element, and a plurality of needles fixed in said needle head parallel to and symmetrical about said punch.

2. In combination with a reciprocating head arranged to move downward in synchronism with the movement into registry therebeneath of centrally apertured conveyor cups, means for pitting cherries and similar fruit comprising a shank, a punch centrally fixed to said shank, a cylindrical guide sleeve disposed about said shank, a centrally apertured needle head slidably positioned within said guide sleeve and about said punch, an inwardly extending flange formed on the bottom of said sleeve and arranged to limit the downward movement of said needle head relative to said sleeve, resilient positioning means disposed between said shank and said needle head, means for preventing rotation of said head relative to said shank, and a plurality of needles fixed in said needle head parallel to and evenly spaced concentrically about said punch.

3. In combination with a reciprocating head arranged to move downward in synchronism with the movement into registry therebeneath of centrally aperatured conveyor cups, means for pitting cherries and similar fruit comprising a shank fixed to said reciprocating head, a punch fixed in said shank, means for axially alining said punch with said centrally apertured conveyor cups, a needle head slidably positioned about said punch, a cylindrical sleeve dimensioned to fit slidably about said needle head, fixed to said shank, an inwardly extending flange formed upon said sleeve and arranged to limit movement of said needle head away from said shank, a spring disposed within said sleeve about said punch and adapted to hold said needle head normally against said flange, a pin fixed in said shank parallel to said punch, a bore in said needle head cooperating slidably with said pin, and a plurality of needles fixed in said needle head symmetrically about said punch, said spring being so tensioned as to permit entry of said needles into a cherry and into contact with the pit thereof during movement of said reciprocating head theretoward, and to permit said needles to remain stationary during subsequent pit expelling motion of said punch.

JOHN SANCHEZ.